US009521169B2

(12) United States Patent
Braudes et al.

(10) Patent No.: US 9,521,169 B2
(45) Date of Patent: *Dec. 13, 2016

(54) SIP ANCHOR POINTS TO POPULATE COMMON COMMUNICATION LOGS

(71) Applicant: Avaya Inc., Basking Bridge, NJ (US)

(72) Inventors: Robert E. Braudes, Dracut, MA (US); Gordon R. Brunson, Broomfield, CO (US); Joel M. Ezell, Broomfield, CO (US); Harsh V. Mendiratta, Old Bridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/586,594

(22) Filed: Dec. 30, 2014

(65) Prior Publication Data

US 2015/0120944 A1  Apr. 30, 2015

Related U.S. Application Data

(63) Continuation of application No. 12/783,249, filed on May 19, 2010.

(51) Int. Cl.
*H04L 29/06* (2006.01)
*H04L 29/08* (2006.01)

(52) U.S. Cl.
CPC ....... *H04L 65/1066* (2013.01); *H04L 65/1006* (2013.01); *H04L 65/1083* (2013.01); *H04L 67/22* (2013.01)

(58) Field of Classification Search
CPC ............. H04L 65/1006; H04L 65/1069; H04L 65/1083; H04L 67/22; H04L 65/1046; H04L 65/1053; H04L 65/1066; H04M 7/0012; H04M 3/2281; H04M 3/5175; H04M 3/56

See application file for complete search history.

(56) References Cited

U.S. PATENT DOCUMENTS 7,319,689 B2 * 1/2008 Dutta ................ H04W 36/0011
370/338
7,467,210 B1  12/2008 Rao et al.
(Continued)

FOREIGN PATENT DOCUMENTS

CN      101395932      3/2009
CN      101420432      4/2009
(Continued)

OTHER PUBLICATIONS

Official Action with English Translation for China Patent Application No. 201110139299.5, dated Jul. 28, 2015 7 pages.
(Continued)

*Primary Examiner* — Backhean Tiv
(74) *Attorney, Agent, or Firm* — Sheridan Ross P.C.

(57) ABSTRACT

The concept of a centralized communication log is provided. Anchor points, and specifically Session Initiation Protocol (SIP) anchor points, serve as a media and call control point that is established on a per-user basis which can then be leveraged by a communication log application. Such a communication log application is able to determine accurate and real-time communicant information for a communication session and populate a centralized communication log with the same. Such a communication log is, therefore, accurate with respect to multiple users in a system, highly available, and scaled horizontally.

21 Claims, 9 Drawing Sheets

(56) References Cited

U.S. PATENT DOCUMENTS

| | | | |
|---|---|---|---|
| 7,535,838 B1* | 5/2009 | Mitchell | H04L 45/00 370/230 |
| 7,640,036 B2* | 12/2009 | Kallio | H04W 36/0066 455/436 |
| 7,865,205 B1* | 1/2011 | Lundy | H04M 1/72522 370/229 |
| 7,903,635 B2 | 3/2011 | Silver et al. | |
| 7,940,722 B1* | 5/2011 | Rosenberg | G06Q 20/102 370/328 |
| 7,958,233 B2 | 6/2011 | Fernandez Gutierrez | |
| 8,032,624 B2 | 10/2011 | Brunson et al. | |
| 8,135,022 B2 | 3/2012 | Sterman et al. | |
| 8,180,338 B1* | 5/2012 | Sylvain | H04W 76/026 455/422.1 |
| 8,250,217 B2 | 8/2012 | Kidachi et al. | |
| 8,320,363 B2 | 11/2012 | Feng et al. | |
| 8,442,005 B2 | 5/2013 | Dutta et al. | |
| 8,510,435 B2* | 8/2013 | Brunson | H04L 65/1046 370/252 |
| 8,600,006 B2* | 12/2013 | Constantinof | H04W 36/0022 379/15.03 |
| 8,600,386 B2* | 12/2013 | Osborn | H04W 76/02 370/331 |
| 8,717,876 B2* | 5/2014 | Watson | H04L 12/66 370/219 |
| 8,804,936 B2 | 8/2014 | Braudes et al. | |
| 8,886,789 B2 | 11/2014 | Braudes et al. | |
| 2003/0212809 A1 | 11/2003 | Wu et al. | |
| 2004/0202295 A1 | 10/2004 | Shen et al. | |
| 2004/0236860 A1* | 11/2004 | Logston | G06F 8/64 709/230 |
| 2004/0240414 A1* | 12/2004 | Fan | H04W 36/26 370/332 |
| 2005/0025047 A1* | 2/2005 | Bodin | H04W 76/025 370/229 |
| 2006/0233135 A1* | 10/2006 | Oswal | H04W 36/0033 370/331 |
| 2006/0258358 A1* | 11/2006 | Kallio | H04W 36/0066 455/437 |
| 2006/0291419 A1* | 12/2006 | McConnell | H04L 29/06027 370/331 |
| 2007/0014281 A1* | 1/2007 | Kant | H04L 29/06027 370/352 |
| 2007/0111752 A1 | 5/2007 | Pazhyannur | |
| 2007/0113275 A1* | 5/2007 | Khanna | H04L 12/4641 726/15 |
| 2007/0242628 A1* | 10/2007 | Dutta | H04W 36/0011 370/310 |
| 2007/0254625 A1* | 11/2007 | Edge | H04M 7/0078 455/404.1 |
| 2007/0291790 A1* | 12/2007 | Ue | H04L 12/5695 370/468 |
| 2009/0003359 A1* | 1/2009 | Yegani | H04W 60/00 370/401 |
| 2009/0005048 A1* | 1/2009 | Bae | H04L 12/4633 455/439 |
| 2009/0073885 A1* | 3/2009 | Jalil | H04L 67/20 370/241 |
| 2009/0193257 A1* | 7/2009 | Sweazey | H04L 9/0894 713/176 |
| 2009/0280810 A1* | 11/2009 | Mahdi | H04W 76/041 455/436 |
| 2010/0039993 A1 | 2/2010 | Ramankutty et al. | |
| 2010/0091653 A1* | 4/2010 | Koodli | H04W 36/0027 370/235 |
| 2010/0106748 A1* | 4/2010 | Schultz | H04L 12/2602 707/803 |
| 2010/0278091 A1* | 11/2010 | Sung | H04W 4/08 370/312 |
| 2011/0055572 A1* | 3/2011 | Vogt | H04L 63/126 713/171 |
| 2011/0081013 A1* | 4/2011 | Braudes | H04L 65/1069 379/243 |
| 2011/0122844 A1* | 5/2011 | Harper | H04W 8/082 370/331 |
| 2011/0128913 A1* | 6/2011 | Chowdhury | H04L 63/0892 370/328 |
| 2011/0216701 A1* | 9/2011 | Patel | H04L 65/1016 370/328 |
| 2011/0289203 A1* | 11/2011 | Braudes | H04L 65/1069 709/224 |
| 2011/0289219 A1* | 11/2011 | Braudes | H04L 65/1083 709/227 |
| 2011/0295943 A1 | 12/2011 | Peuziat et al. | |
| 2012/0275432 A1* | 11/2012 | Lei | H04W 36/0022 370/331 |
| 2012/0307732 A1* | 12/2012 | Olsson | H04W 64/00 370/328 |
| 2015/0117440 A1 | 4/2015 | Riffe | |
| 2015/0156221 A1 | 6/2015 | Abtin | |

FOREIGN PATENT DOCUMENTS

| | | |
|---|---|---|
| EP | 2247031 | 11/2010 |
| EP | 2293520 | 3/2011 |
| GB | 2394866 | 5/2004 |
| JP | 2008-219461 | 9/2008 |
| KR | 2005/0052591 | 6/2005 |
| WO | WO 2011/087568 | 7/2011 |

OTHER PUBLICATIONS

"Intelligent Network (IN)," Web ProGorum Tutorials, The Int'l Engineering Consortium, 1999, 32 pages retrieved from http://www.iec.org.

Rosenberg et al., "Best Current Practices for Third Party Call Control (3pcc) in the Session Initiation Protocol (SIP)—Request for Comments 3725," Internet Engineering Task Force, Apr. 2004, 31 pages.

Official Action (with English translation) for Chinese Patent Application No. 201110138910.2 dated May 6, 2013, 13 pages.

English Translation of Official Action for China Patent Application No. 201110138910.2, mailed Jan. 27, 2014 5 pages.

Official Action (with English translation) for China Patent Application No. 201110138910.2, mailed Aug. 7, 2014 15 pages.

Notice of Allowance with English Translation for China Patent Application No. 201110138910.2, dated Feb. 11, 2015 5 pages.

Combined Search and Examination Report for UK Patent application No. GB1108366.4, dated Sep. 15, 2011.

English Translation of Official Action for China Patent Application No. 201110139299.5, dated Feb. 7, 2014 12 pages.

Official Action with English Translation for China Patent Application No. 201110139299.5, dated Sep. 28, 2014 19 pages.

Official Action with English Translation for China Patent Application No. 201110139299.5, dated Jan. 20, 2015 17 pages.

Search Report for UK Patent application No. GB1108364.9, dated Sep. 2, 2011.

Official Action for U.S. Appl. No. 12/783,224, mailed Nov. 21, 2012 14 pages.

Official Action for U.S. Appl. No. 12/783,224, mailed May 2, 2013 17 pages.

Official Action for U.S. Appl. No. 12/783,224, mailed Mar. 10, 2014 11 pages.

Notice of Allowance for U.S. Appl. No. 12/783,224, mailed Jun. 30, 2014 9 pages.

Official Action for U.S. Appl. No. 12/783,249, mailed Jun. 26, 2012 13 pages.

Official Action for U.S. Appl. No. 12/783,249, mailed Dec. 5, 2012 15 pages.

Official Action for U.S. Appl. No. 12/783,249, mailed Mar. 27, 2014 15 pages.

Official Action for U.S. Appl. No. 12/783,249, mailed Sep. 26, 2014 17 pages.

(56) References Cited

OTHER PUBLICATIONS

Official Action for UK Patent Application No. GB1108364.9, dated Jan. 13, 2016, 3 pages.
Official Action for UK Patent Application No. GB1108364.9, dated Apr. 26, 2016, 2 pages.
Notice of Grant for UK Patent Application No. GB1108364.9, dated Sep. 13, 2016, 2 pages.
Official Action for U.S. Appl. No. 12/783,249, mailed Jan. 6, 2016 27 pages.
Notice of Allowance for U.S. Appl. No. 12/783,249, mailed May 9, 2016 11 pages.

\* cited by examiner

SIP ANCHOR POINTS TO POPULATE COMMON COMMUNICATION LOGS

CROSS-REFERENCE TO RELATED APPLICATIONS

This application is a continuation of U.S. patent application Ser. No. 12/783,249, filed in the U.S. Patent Office on May 19, 2010, the entire disclosure of which is hereby incorporated herein by reference.

FIELD OF THE DISCLOSURE

The disclosure relates generally to communications and specifically to communication logs.

BACKGROUND

Session Initiation Protocol (SIP) is an open signaling protocol for establishing many kinds of real-time communication sessions. Examples of the types of communication sessions that may be established using SIP include voice, video, and/or instant messaging. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

Many SIP communications are enhanced by virtue of the fact that an application is inserted or included into the communication session during the establishment of that session. The incorporation of applications into a communication session is typically referred to as application sequencing because the applications are sequentially invoked during the establishment of the communication session. In some instances the applications are owned and operated by an enterprise that is administering the SIP network. In some instances, the applications may be provided by third-party vendors. In either event, the traditional way in which applications were included in the communication session was during the communication session establishment stage so that these applications can insert themselves into the signaling and media path of the communication session.

Exemplary types of applications that may be utilized for a communication session include, without limitation, call recording applications, communication log applications, conferencing applications, security applications, encryption applications, collaboration applications, whiteboard applications, mobility applications, presence applications, media applications, messaging applications, bridging applications, and any other type of application that can supplement or enhance communications.

There is currently no good way in a distributed network to ensure that applications can provide media services on a per-party basis regardless of call topology and intermediate applications. There is also no good solution which allows an application to become aware of and control a communication session after that session has been established. There is also no good way to share media resources across multiple applications.

In addition to the above-described shortcomings, there are also no good solutions for providing a real-time centralized communication log. Currently available communication logs will also not indicate when a call was addressed to an individual but redirected by a sequenced application. In addition to these shortcomings, there is currently no way to distribute communication log information to non-involved participants in real-time, which means that endpoints do not get "live" updates of calls in progress and, therefore, do not have an opportunity to become aware of and control those calls.

SUMMARY

It is, therefore, one aspect of the present disclosure to provide the concept of an anchor point to overcome the aforementioned shortcomings. In particular a SIP anchor point is provided at one or more locations within the communication sequence. The SIP anchor point can be leveraged to realize several features that were previously unavailable.

In particular, it is one aspect of the present disclosure to provide a per-user or per-community centralized communication log that leverages the unique features of anchor points. In particular, communication log applications are provided which can monitor one or more communication sessions on behalf of a user or group of users and particularly the communicants participating in such sessions. The communication log application proposed herein is adapted to monitor the communication sessions by establishing a session with one or more anchor point servers sequenced into the session. Information regarding communicants in the communication session and other information regarding key events is retrieved by the communication log application and provided to a communication log and database for organization and storage.

This particular type of configuration and utilization of anchor points allows a communication log application and per-user centralized communication logs to achieve a number of things not previously attainable. In particular, a more scalable per-user centralized communication log is provided. Second, a communication log can be maintained for a number of endpoints rather than relying on each endpoint to maintain its own communication log. Third, more accurate communication logs can be maintained, even if participants or applications are added during the communication session. Fourth, real-time information related to current communication sessions can be displayed, maintained, or rendered in the communication log, thereby providing users an easy and efficient way of joining, monitoring, and/or controlling a communication session currently under way.

In accordance with at least some embodiments of the present disclosure a method is provided that generally comprises:

monitoring, by a communication log application, a communication session, wherein the communication log application monitors the communication session via an anchor point, wherein the anchor point is included in a signaling path of the communication session;

monitoring, by the communication log application, communicants in the communication session; and performing at least one of the following steps:
(i) providing, by the communication log application to a per-user centralized communication log database, information related to the communicants in the communication session;

(ii) receiving, at the communication log application from the per-user centralized communication log database, information related to at least one of the communicants in the communication session; and (iii) receiving, at the communication log application from the per-user centralized communication log database, that information related to at least one of the communicants has been changed.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize anchor points.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1A:
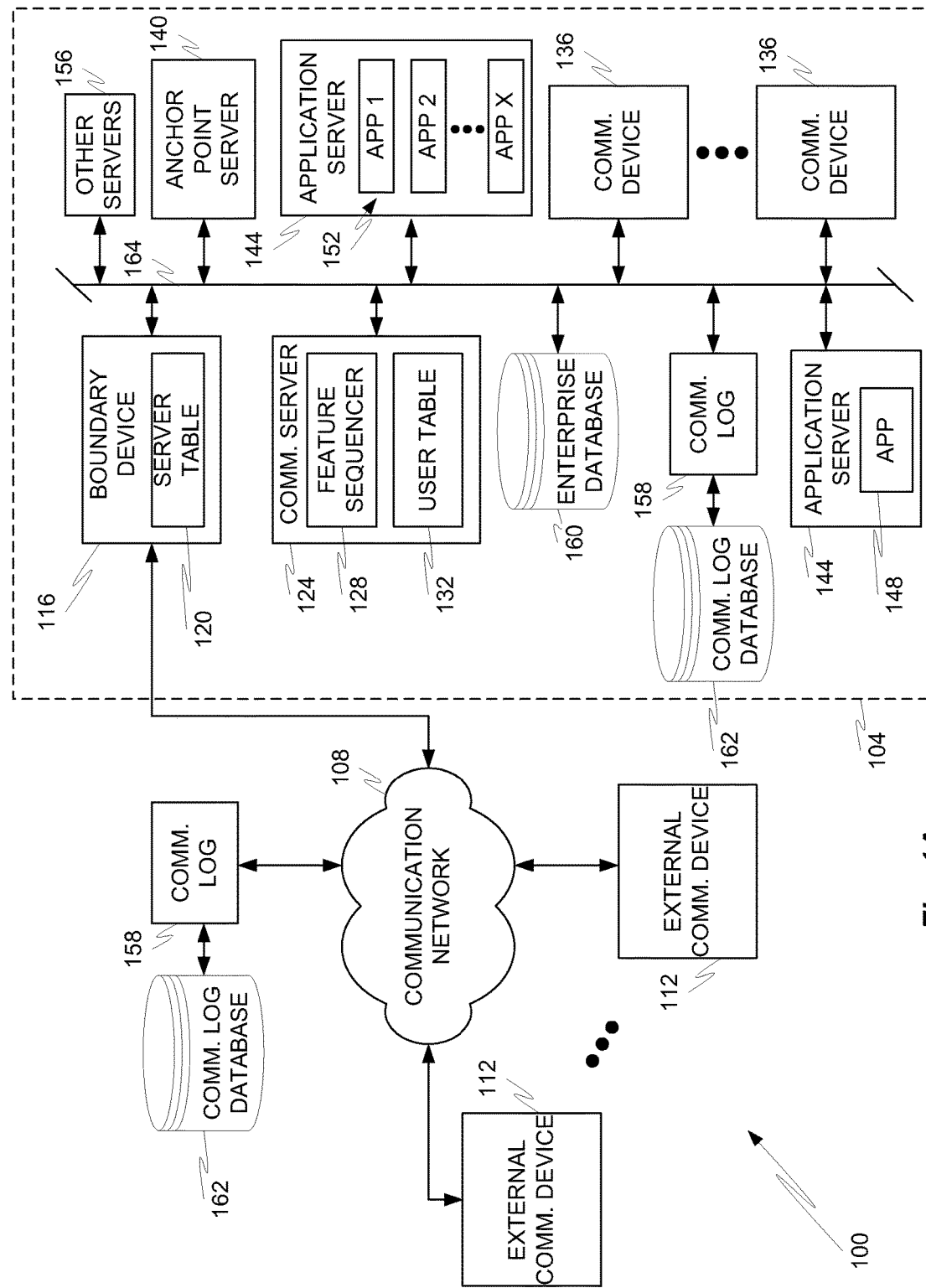
FIG. 1A is block diagram depicting a communication system in accordance with embodiments of the present disclosure.

FIG. 1A depicts a communication system 100 according to an embodiment of the present disclosure. The communication system 100 may include an enterprise network 104 that is in communication, via a (typically untrusted or unsecure or public) communication network 108, with one or more external communication devices 112. The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, an anchor point server 140, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and service a first subset of enterprise users whereas a second communications server 124 may be authoritative for and service a second subset of enterprise users, where the first and second subsets of users generally do not share a common user. This is one reason why the network boundary device 116 may be provided with a server table 120.

Additionally, multiple servers 124 can support a common user community. For example, in geo-redundant and other applications where users aren't necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but this is not necessarily required. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 includes a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features should be incorporated into a communication session for the user. The feature sequencer 128 can actually provide communication features directly into the communication session or the feature sequencer 128 can determine an application sequence which will be invoked during set-up and used during the communication session.

In accordance with at least some embodiments, the feature sequencer 128 can determine an application sequence and cause one or more applications 148, 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, this process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-media communications are established and conducted.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log application, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

In accordance with at least some embodiments of the present disclosure, the anchor point server 140 is provided as a mechanism to create anchor points in a user's communication sequence thereby allowing certain applications 148, 152 to become aware of and control a communication session after the session has been established or allow certain applications 148, 152 to leave a communication session before the session has ended. Particularly, the anchor point server 140 may bind an anchor point or multiple anchor points to a communication session during set-up, but may not necessarily bind any media resource to the communication session until an application identifies a need for that media resource. Accordingly, the anchor point server 140 may incorporate one or more anchor points into the logical communication sequence before and/or after other sequenced applications are bound to the communication session.

Prior to the introduction of anchor points, if an application 148, 152 wanted to have the ability to exert media control on a given communication, it would have to be explicitly provisioned as a sequenced application. However, some applications don't really care about the communication setup phase: they are content to let the communication proceed to the originally addressed party and then exert media and call control mid-session. Provisioning such applications as sequenced applications can often result in an unnecessary waste of media resources.

In some embodiments, anchor points are not unique to an application. Instead, they are control points that any application may leverage. They may not even be provisioned but instead are sequenced in automatically by the feature sequencer 128 which would know what anchor points server 140 is authoritative for a given user, as this information may also be found in the user table 132. The anchor point provided by an anchor point server 140 would always be sequenced into at least one point of the application sequence. The location in which the anchor point is placed may vary depending upon the types of features which are desired. Moreover, multiple anchor points may be inserted into a communication session without departing from the scope of the present invention.

The applications that leverage anchor points would be provided with a logical call model similar to that provided by a computer supported telephony application (CSTA), Parlay-X, or any other paradigm used to communicate call state and operations between an application and an anchor point. Such applications that would potentially want to leverage an anchor point would subscribe to call events for endpoints of interest and would be notified when call/connection status changes for a communication session. In some embodiments, the anchor points would not be visible to the applications. Instead, they would invoke media operations on calls or connections within that call and the anchor points would be leveraged transparently.

In most cases, an anchor point would not initially involve a media resource or application 148, 152 in the media path (e.g., a Real time Transport Protocol (RTP) path). Instead, the anchor point inserts itself as a Back-to-Back User Agent (B2BUA) in the signaling path. Only when an application requests a media action would the anchor point start a Media Server Markup Language (MSML) session with the application server 144 then RE-INVITE to each side to insert the application server 144 into the RTP path. In embodiments where the anchor point is located "next-door" to the endpoint, it is always guaranteed to be able to play or record exclusively to that given endpoint/user. Since it is possible to add anchor points for each user in an enterprise call, per-party media operations would generally be possible regardless of any intermediate conference foci or applications. Since the media resources required to implement a particular application 148, 152 are not inserted into the path until it is needed, media resources are not wasted and additional RTP delay is avoided.

If each anchor point always brought its own media resources this would potentially result in wasted resources and additional RTP delay. This is where media tokens may be utilized. The first anchor point to insert a first media resource (e.g., a media server) will include a media token in the header of the INVITE or RE-INVITE that is eventually received by a second anchor point involved in the same communication session. This other anchor point will, in most cases, then use the media token information to leverage the media server inserted by the first anchor point, if possible. However, if an intermediate application or conference focus has inserted its own media resources, this media resource reuse by the other anchor point could result in the same problem as before with an application thinking that it is playing or recording one party but really getting multiple parties. To get around this problem the second anchor point will compare the Session Description Protocol (SDP) information in the media token with the SDP information it received in the RE-INVITE. If the SDP attributes match, there is no intermediate media server and the first media resource may be reused. If they do not match, then a new media resource is introduced for the second application. Additional descriptions of media tokens and the advantages of using the same are provided in U.S. patent application Ser. No. 12/574,604 to Braudes et al. filed Oct. 6, 2009, the entire contents of which are hereby incorporated herein by reference.

One feature that can be supported is that an application can tell the anchor point that it should always include a particular media resource for all calls for a given user (i.e., based on user preferences in the user table 132). An example would be if the application knows that it always wants to record all calls for a given user. In that case, the application would indicate this to the anchor point (perhaps with a parameter when establishing a monitor for that user) and, therefore, the potential for "clipping", which would be otherwise introduced by inserting a new media resource mid-call, would be eliminated.

In some embodiments, these anchor points could also potentially be used for call control purposes, being a B2BUA. They would enable transfer, conference, drop operations on behalf of another controlling entity.

The other servers 156 may comprise email servers, voicemail servers, calendaring servers, conferencing servers, and other types of servers known to provide particular services to client devices. In some embodiments, the other servers 156 may also be considered application servers 144, which provide one or more applications for use in a communication session.

The internal communication devices 136 can be similar or identical to the external communication devices 112, except they are provisioned, and often owned, by the enterprise. Exemplary types of communication devices 112 include, without limitation, any capable phone, hardphone, softphone and/or digital telephone. Examples of suitable telephones include the 1600™, 2400™, 4600™, 5400™, 5600™, 9600™, 9620™, 9630™, 9640™, 9640G™, 9650™, and Quick Edition™ telephones, IP wireless telephones (such as Avaya Inc.'s IP DECT™ phones), video phones (such as Avaya Inc.'s Videophone™), and softphones of Avaya, Inc.

The enterprise database 160 includes enterprise subscriber information, such as name, job title, electronic address information (e.g., telephone number, email address, instant messaging handle, direct dial extension, and the like), subscriber contact lists (e.g., contact name and electronic address information), other employee records, and the like.

The system 100 may further include a communications log 158 and communications log database 162. The communications log 158 and communications log database 162 may be provided within the enterprise network 104 or outside the enterprise network 104 by a third-party service provider.

The communication log 158 may be enabled to receive real-time and non-real-time data updates from communication log applications (one exemplary implementation of an application 148 and/or 152) operating on behalf of a user or group of users within the enterprise 104. The communication log 158 receives the data updates and stores the information within the communication log database 162.

The communication log 158 also serves as a point of access for communication log information. In particular, entities such as user communication devices 112, 136 may send data requests to the communication log 158 asking for communication log information for a particular user or set of users. The communication log 158 can retrieve the requested information from the communication log database 162 and provide the requested information back to the requesting entity. In some embodiments, the information provided back to the requesting entity is real-time communication log information representing the current communication log state minus the processing delay of receiving the request, retrieving the data, and providing the data back to the requestor. Such real-time communication log information can be used by the requestor to assess the state of a user's communication log and utilize that information to determine whether the user wants to join an in-progress communication session, retrieve a call from cover (e.g., voicemail or secretarial coverage), or exert monitoring and/or control operations over an in-progress communication session.

In some embodiments, the implementation of the communication log 158 and/or communication log database 162 may be partitioned by user community and/or user to provide scalability and availability. Thus, references made to a centralized communication log herein may be more accurately regarded as a per-user centralized communication log in that a single communication log 158 may be authoritative for communication log information for a particular user or subset of users within the enterprise community, much like the communication server 124. Thus, although only a single communication log 158 is depicted within the enterprise network 104, one skilled in the art will appreciate that multiple communication logs 158 and/or communication log databases 162 may be provided within an enterprise network 104 depending upon the size of the enterprise user community. Partitioning the communication logs 158 by user provides the ability to scale per-user centralized communication logs across a large user populate and also provides for high availability.

Since anchor points can also be provided on a per-user basis, a communication log application for a particular user can utilize a particular anchor point to retrieve any communication log information for that user within a communication session and provide any such information to the communication log 158 for storage in connection with that user's data structure in the communication log database 162. Thus, an anchor point can be utilized as a mechanism for a user's communication log application to harvest information related to key events and contribute that information back to a singleton log that also holds subscriptions of other applications (e.g., call recording applications or the like) interested in the user's communication activity.

The various servers and components depicted in FIG. 1A may be implemented separately (i.e., on different servers) or together (i.e., on a single server). In particular, two or more depicted components (e.g., communication server 124 and communication log 158/communication log database 162) may be implemented on a single server without departing from the scope of the present invention. Thus, a single device may provide the functionality of several components depicted separately in FIG. 1A. As another example, the boundary device 116 and communication server 124 may be implemented on a single device. As yet another example, the anchor point server 140, communication log 158, communication log database 162, and/or application server 144 may be implemented on a single server.

Figure 1B:
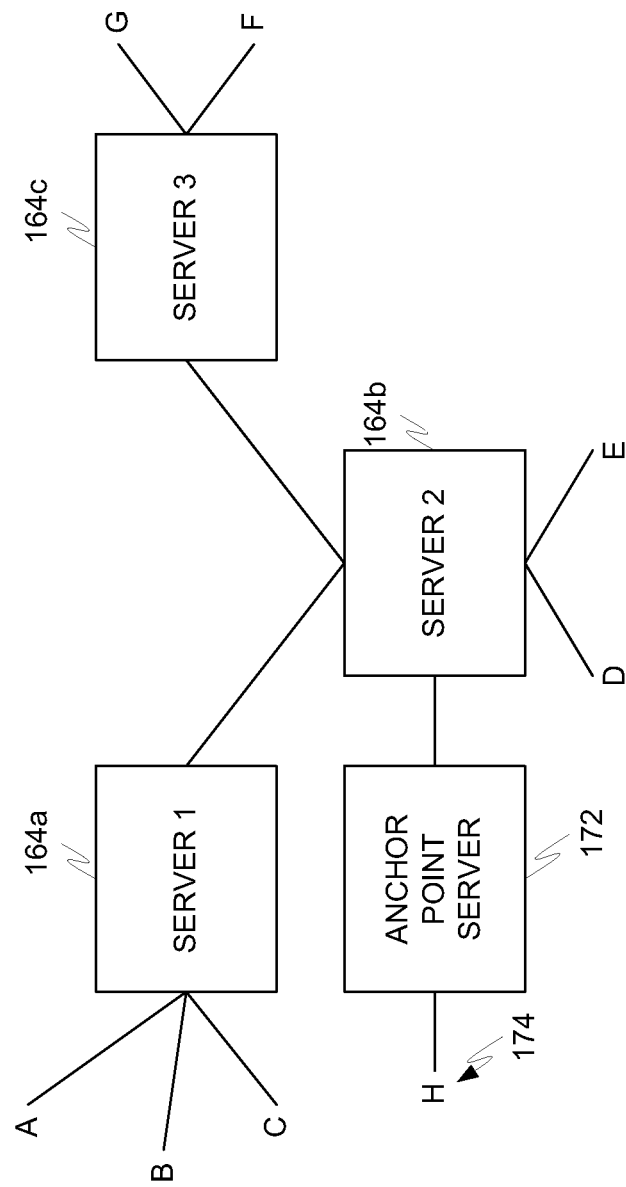
FIG. 1B is a block diagram depicting a physical call model in accordance with embodiments of the present disclosure.

FIG. 1B depicts an exemplary physical call model (or communication model) in accordance with embodiments of the present disclosure. The physical call model between two or more parties incorporates one or more servers 164a, 164b, 164c into the call as a conference focus or media mixer. In some embodiments, the servers incorporated into the physical call model include one or more of an application server 144, a communication server 124, and the like. In some embodiments, each server 164a, 164b, 164c serves as a conference focus and/or media mixer for one or more applications. This enables a call to have several applications connected thereto, where each application may service one or more users or endpoints A-H involved in the call. An anchor point server 172 may also be included in the physical call model. The anchor point server 172 is capable of providing an anchor point which serves as a potential control point for other application(s) 174, which may or may not have been initially included in the application sequence during call setup.

It is generally the case within an enterprise network that each participant to a communication session has at least one anchor point associated with that user that is connected to the communication session. Thus, a communication session between two participants would likely have two anchor points, one for each user or endpoint A-H. Thus, although FIG. 1B only depicts a single anchor point server 172 involved in the physical call model, one, two, three, four, or more anchor point servers 172 and/or anchor points may be involved in a single communication session and, therefore, be involved in the same physical call model. Moreover, a single anchor point server 172 may be capable of providing multiple anchor points for a single user and/or multiple anchor points for multiple different users. It is also possible that a single user or endpoint may have multiple anchor points associated therewith without departing from the scope of the present invention. It should also be noted that although there are only three servers 164a, 164b, 164c depicted in FIG. 1B, the anchor point(s) are configured to ensure that a given application still has access to per-party media.

The servers 164a, 164b, 164c are capable of conferencing the endpoints A-H together in a cascaded conference. Thus, a sequenced application may have initiated this conference and without the anchor point servers 172 next to the endpoint A-H, the anchor point application (i.e., the application leveraging the anchor point to monitor and/or control the communication session) wouldn't have access to per-party media, although other benefits of the logical call model could remain.

Figure 1C:
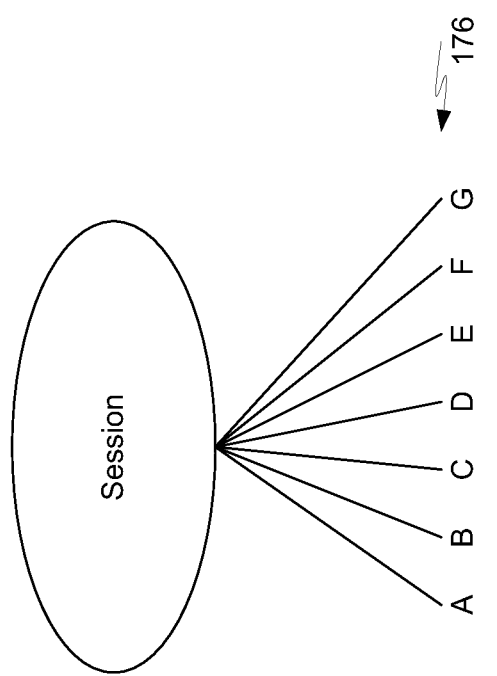
FIG. 1C is a block diagram depicting a logical call model in accordance with embodiments of the present invention.

FIG. 1C depicts an exemplary logical call model (or communication model) in accordance with embodiments of the present disclosure. The logical call model comprises a session where multiple participants 176 are participating therein. The logical call model is accompanied with a set of call control and media control operations for the endpoints 176 and with a set of call/media progress events that may be shared among the various operations and applications. One of the benefits of the logical call model is that the physical topology and the presence of the anchor points is hidden from the application. The application simply invokes media operations for one of the users and behind the scenes the anchor point actually implements the operation.

Figure 2A:
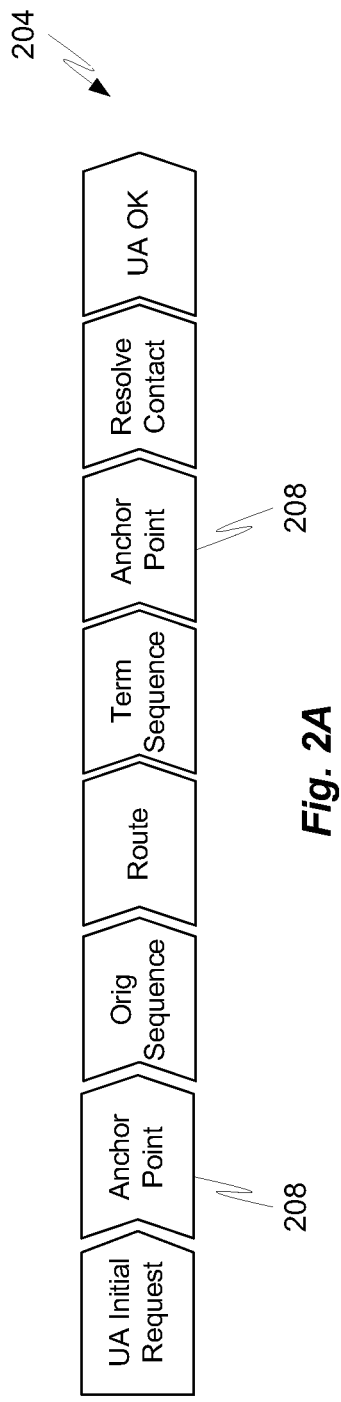
FIG. 2A is a diagram depicting a first possible application sequence in accordance with embodiments of the present disclosure.

Referring now to FIGS. 2A-2D, exemplary configurations of application sequences will be discussed in accordance with embodiments of the present disclosure. FIG. 2A depicts a first possible configuration of an application sequence 204. As can be seen, the first step in the communication set-up process involves processing the originating UA's request. During this process a communication session-establishment message is received from an originating user (e.g., caller) and more particularly a UA associated with the originating user. The UA may be either an internal communication device 136 or a SIP trunk in the instance where the UA is an external communication device 112. Upon receiving the initial request, the message may be forwarded to the feature sequencer 128, which decides to invoke the anchor point server 140 which inserts an anchor point 208 into the communication session before any other applications are specifically sequenced into the communication session. This may be accomplished by sending the initial request to the anchor point server 140 which inserts itself to the communication session and determines the parameters of the communication session, thereby allowing the anchor point server 140 to bind subsequent applications to the communication session after it has been established. Alternatively, if the anchor point server 140 received a request from an application to join the session prior to establishment of the session, then the anchor point server 140 can attach that application to the communication session via the newly created anchor point 208.

Thereafter, the origination-side application sequence is executed. In some embodiments, the origination-side application sequence may be determined based on the identity of the originating user and that user's preferences as defined in the user table 132. In some embodiments, a generic origination-side application sequence is followed if the originating user doesn't have any preferences or if the originating user is not an enterprise user.

Once the origination-side application sequence has been completed, the request is routed to the authoritative communication server 124 of the target user (i.e., callee), assuming that the target user is an internal user. The authoritative communication server 124 of the target user may be the same as that of the originating user, although this is not necessarily required. The feature sequencer 128 then determines a termination-side application sequence. This application sequence is implemented by passing the request to each of the applications 148, 152 which are included in the application sequence. Alternatively, if the target user is an external user (i.e., non-enterprise user), then either a default application sequence is implemented or no application sequence is implemented.

Regardless of whether or not an actual application sequence is implemented, an anchor point 208 may be inserted into the sequence 204. After the anchor point 208 has been inserted, contact resolution occurs. The contact resolution phase of the set-up process generally includes identifying a device or set of devices associated with the target user that are to be alerted. A further description of contact resolution is provided in U.S. patent application Ser. No. 12/488,277 to Brunson et al., the entire contents of which are hereby incorporated herein by reference.

Based on the contact resolution phase, one or more devices associated with the target user are alerted and the target user answers the request (e.g., by picking up a phone, taking the phone off-hook, accepting a communication session invitation, etc.). Once answered, an OK message is sent back to the initiating user and the communication session is established.

Figure 2B:
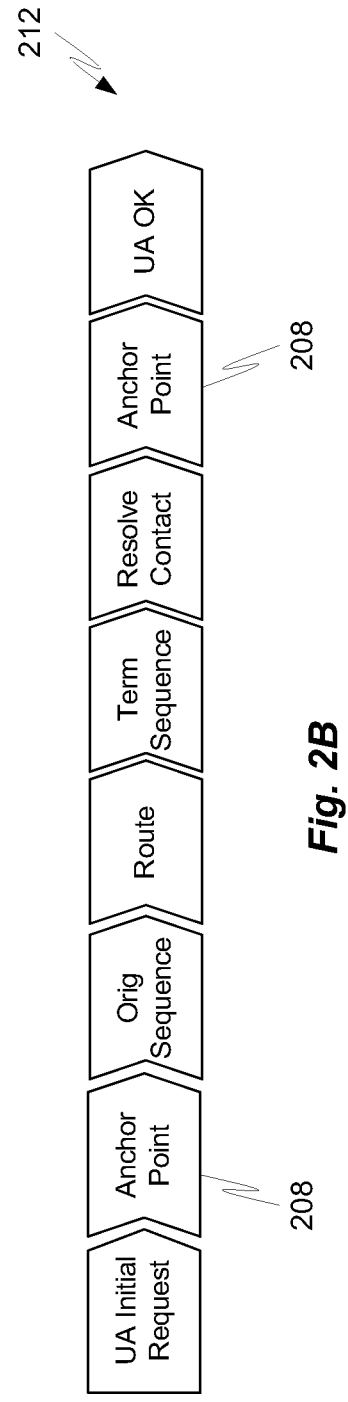
FIG. 2B is a diagram depicting a second possible application sequence in accordance with embodiments of the present disclosure.

As can be seen in FIG. 2B, an anchor point 208 on the termination-side of the sequence 212 may be inserted after the contact resolution phase has been performed. This may be done as an alternative or in addition to having the anchor point inserted between the termination-side application sequence and the contact resolution.

Figure 2C:
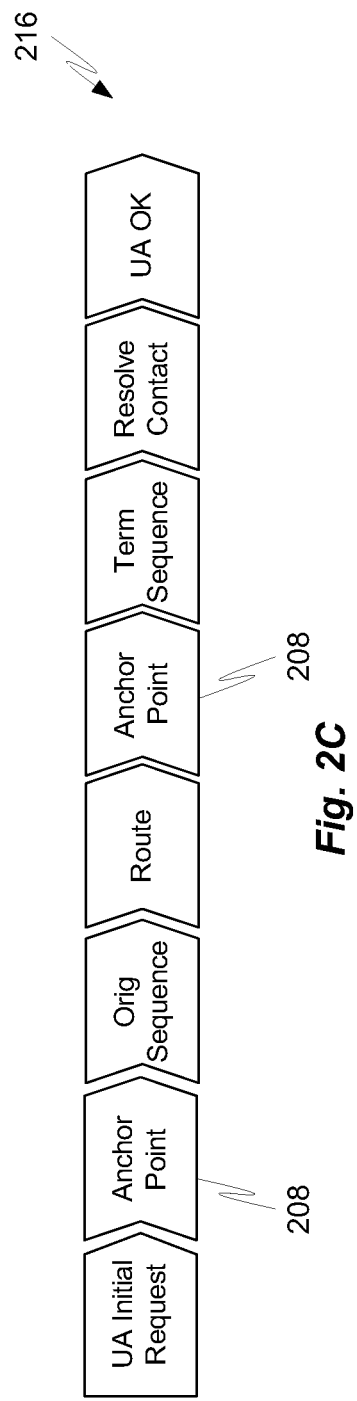
FIG. 2C is a diagram depicting a third possible application sequence in accordance with embodiments of the present disclosure.

As can be seen in FIG. 2C, an anchor point 208 on the termination-side of the sequence 216 may be inserted before the termination-side application sequence. This is particularly useful for situations where a communication log application is leveraging the anchor point 208 to realize a centralized communication log. This may be done as an alternative or in addition to placing anchor points 208 in the locations depicted in FIGS. 2A and 2B.

Figure 2D:
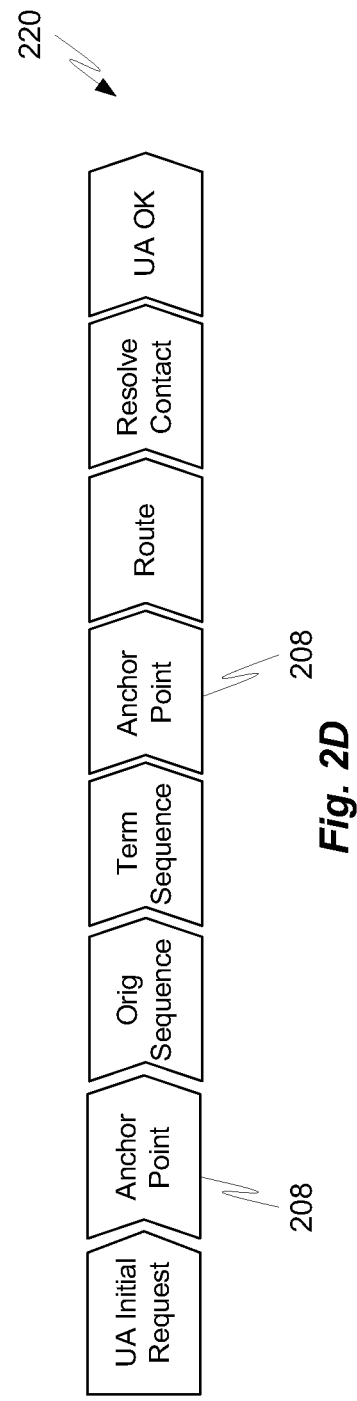
FIG. 2D is a diagram depicting a fourth possible application sequence in accordance with embodiments of the present disclosure.

As can be seen in FIG. 2D, implicit user application sequencing 220 may also be implemented such that the route step occurs after the origination-side and termination-side application sequence. This may be done as an alternative or in addition to placing anchor points 208 in the locations depicted in FIGS. 2A, 2B, and 2C.

Although not depicted, the anchor point 208 on the origination-side of the sequence may also be located after the origination-side application sequence. Again, this additional possible location may be selected as an alternative or in addition to having the anchor point 208 located before the origination-side application sequence.

Other locations of an anchor point 208 are also possible although not depicted. For example, an anchor point 208 may be inserted at any position including in-between sequenced applications. There is no limitation on the location(s) of anchor point 208 placement within a sequence.

A single anchor point server 140 may be responsible for inserting all of the anchor points 208 into a sequence. Alternatively, different anchor point servers 140 may be utilized to insert each of the anchor points 208 into the sequence. For example, if a first anchor point server 140 is authoritative for the calling party and a second anchor point server 140 is authoritative for the called party, then the first anchor point server 140 may insert anchor points for the calling party whereas the second anchor point server 140 may insert anchor points for the called party.

The "location" of an anchor point 208 usually provides two results. First, an anchor point 208 having a specific location will be provided with a communication request after an application having a location in front of that anchor point 208 has been provided with the communication request. Likewise, an application having a location behind that anchor point 208 will receive the communication request after the anchor point 208 has received the communication request. Second, the location of the anchor point 208 determines the relative point in time, as compared to other applications and media resources included in the call sequence, at which the anchor point 208 receives control and media signaling associated with the established communication session. Accordingly, the location of an anchor point 208 will affect the way in which the anchor point 208 and applications leveraging the anchor point 208 view a communication session. Advantageously, if the anchor point 208 comes first in the sequence, then it is guaranteed per-party media access to the communication session. If the anchor point comes after other application on the origination-side, then it can see whether the message has been redirected or otherwise decorated.

Figure 3:
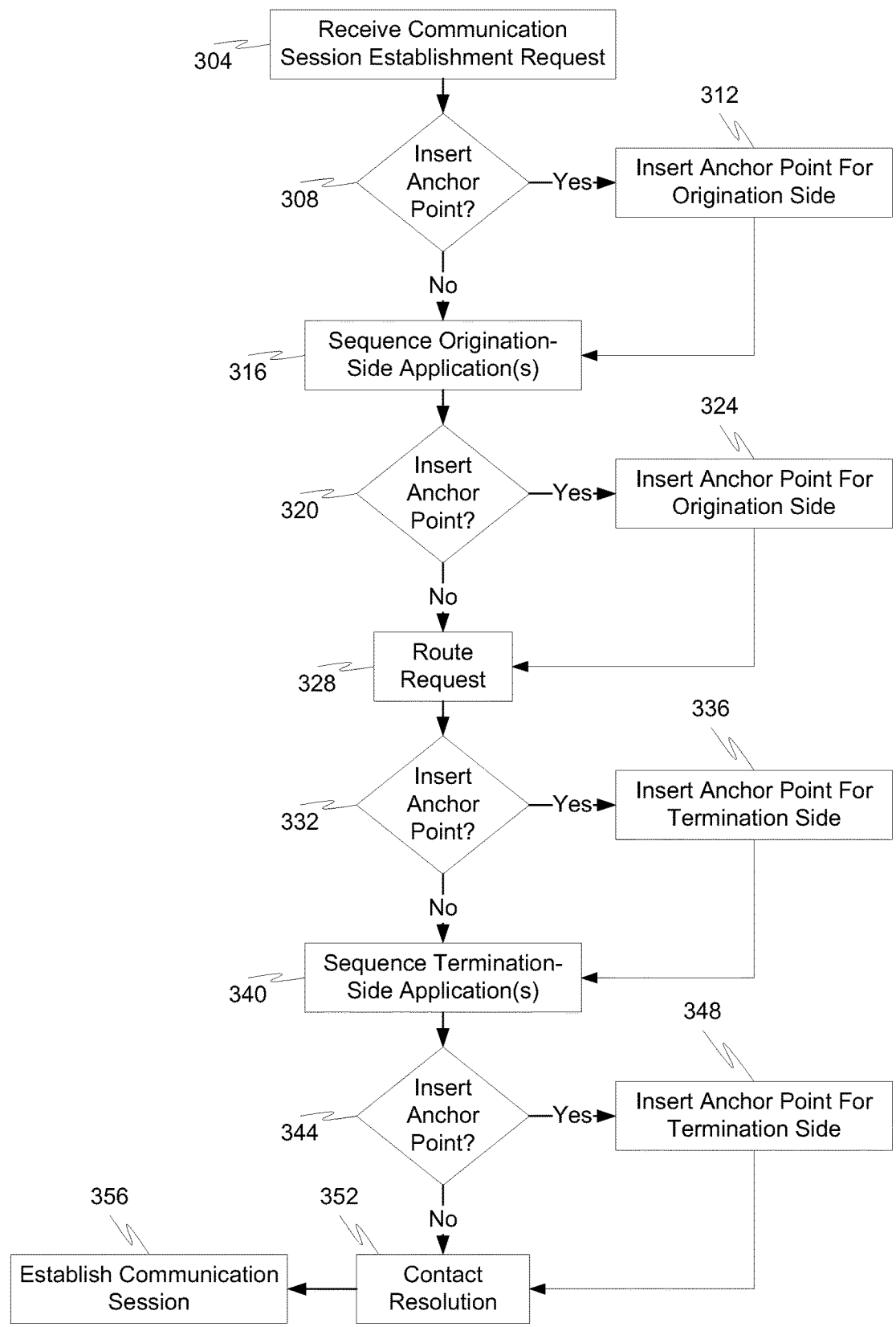
FIG. 3 is a flow diagram depicting communication session establishment method in accordance with embodiments of the present disclosure.

Referring now to FIG. 3, an exemplary method of binding anchor points 208 to a communication session during communication set-up will be described in accordance with embodiments of the present disclosure. The method is initiated when a communication session establishment request is received at an enterprise network 104 (step 304). The enterprise network 104 may include a feature sequencer 128 that determines whether an anchor point 208 is desired as a first feature in the communication session (step 308). If the answer to this query is affirmative, then the feature sequencer 128 invokes an anchor point server 140 to insert an anchor point 208 first on the origination side of the sequence (step 312). Thereafter, or if the query of step 308 is answered negatively, the method proceeds with the sequencing of the origination-side application(s) (step 316).

Following completion of the origination-side application sequencing, the method continues with the feature sequencer 128 determining whether an anchor point 208 is to be inserted lastly on the origination side (step 320). This determination may be made after the origination-side applications have been sequenced or the determination may have been made prior to the feature sequencer 128 starting the application sequencing process. If the answer to this query is affirmative, then the feature sequencer 128 invokes an anchor point server 140 to insert an anchor point 208 lastly on the origination side of the sequence (step 324). Thereafter, or if the query of step 320 is answered negatively, the method proceeds with the routing of the request to a communication server 124 that is authoritative for the target user (step 328). In accordance with the embodiment depicted in FIG. 2D, however, the routing step may not occur until after the termination-side application sequencing (i.e., after step 340).

Once the request has been routed to the appropriate communication server 124, the feature sequencer 128 of that server determines whether an anchor point 208 is to be inserted first on the termination-side of the call (step 332). If the answer to this query is affirmative, then the feature sequencer 128 invokes an anchor point server 140 to insert an anchor point 208 first on the termination side of the sequence (step 336). Thereafter, or if the query of step 332 is answered negatively, the method proceeds with the sequencing of the termination-side application(s) (step 340).

Following completion of the termination-side application sequencing, the method continues with the feature sequencer 128 determining whether an anchor point 208 is to be inserted lastly on the termination side (step 344). As noted above, an anchor point 208 can be inserted lastly on the termination side before and/or after the contact resolution has occurred. If the answer to the query of step 344 is answered affirmatively, then the feature sequencer 128 invokes an anchor point server 140 to insert an anchor point 208 (step 348) either before or after contact resolution is performed, or both (step 352). Thereafter, the communication session between the originating user and the target user is established and the parties are allowed to communicate while also using any applications sequenced into the communication session (step 356). Although not depicted in FIG. 3, one or more anchor points 208 may also be inserted in-between applications on either the origination-side application sequence or the termination-side application sequence.

Figure 4:
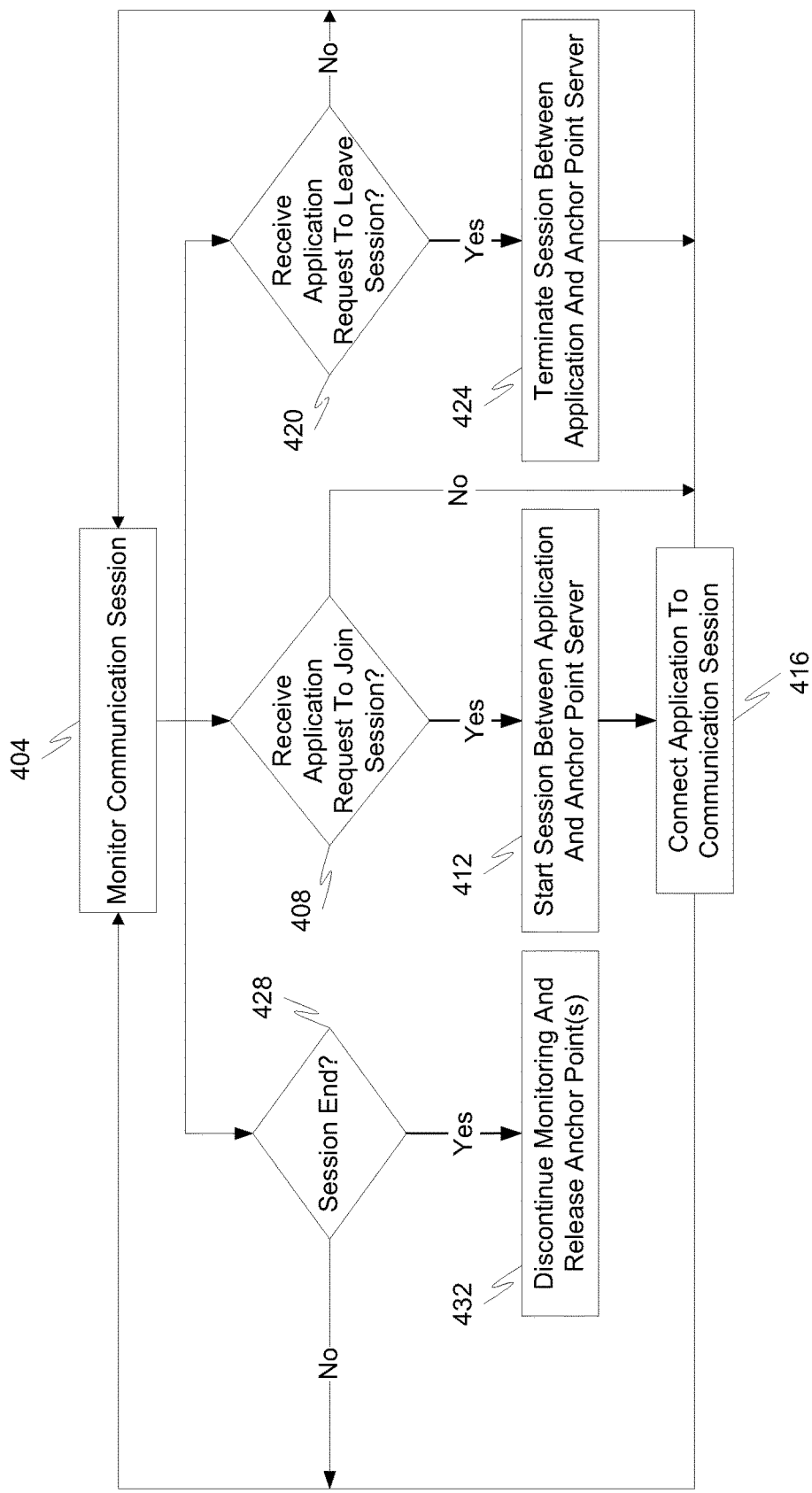
FIG. 4 is a flow diagram depicting a method of leveraging a SIP anchor point in accordance with embodiments of the present disclosure.

With reference now to FIG. 4, an exemplary method of leveraging an anchor point 208 will be described in accordance with at least some embodiments of the present disclosure. The method is initiated with the monitoring of a communication session which has been established between two or more users (step 404). The communication session under inspection had one or more anchor points 208 bound thereto during the establishment of the communication session. Certain media resources and applications may be provided with enough information regarding the communication session to allow the resources and applications to monitor the communication session directly (e.g., by receiving status updates regarding the communication session or by employing packet-replication technology). Alternatively, the media resources and application not initially bound to the communication session may monitor the communication session by subscribing to event notifications from the anchor point 208 or by subscribing to event notifications from certain applications (e.g., communication log applications) which utilize the anchor point 208.

After establishment of the communication session, one or more parallel decisions can be made. In particular, the determination can be made as to whether or not an application wants to join a session (step 408), whether or not an application wants to leave the session (step 420), and whether or not the session has ended (step 428).

At some point an application which was originally not bound to the communication session may determine that it desires to control part of the communication session for one reason or another (i.e., "join" the communication session). Such a determination may be made based upon predefined user preference (i.e., preferences defined by a user before the establishment of the communication session) or based upon receiving a real-time command from a user indicating a desire to execute a particular function on the communication session (step 408). If the appropriate application or media resources needed to fulfill the user request or satisfy the predefined user preferences are not currently included in the communication session, then the necessary media resource or application may attempt to leverage the anchor point 208 that has a preferred location for that resource or application. In some embodiments, the anchor point server 140 which is administering the desired anchor point 208 is signaled by the resource or application which desired to join the communication session. In other embodiments, the anchor point server 140 may be able to unilaterally make the determination that a new resource is needed for the communication session and the anchor point server 140 may signal the appropriate resource or application indicating the same.

After it has been determined that a new application is to join the existing communication session, the method continues with the establishment of a session between the application and the anchor point server 140 administering the desired anchor point 208 (step 412). This process usually involves the anchor point server 140 communicating with the new application over a protocol that conveys the logical call model and related operations and/or events. Thereafter, if the application invokes a media action and there is not already a media server available to the anchor point 208, the anchor point server 140 will Re-INVITE call participants such that a media server is inserted in the RTP stream on the application's behalf (step 416). The method then returns to step 404 where the monitoring of the communication session continues.

Referring back to step 404, the method may proceed in parallel with making a determination as to whether or not any application currently included in the communication session desires to cease monitoring and controlling the session (i.e., "leave" the session) (step 420). This decision to leave the communication session can be made either by the application wanting to leave the session or by the anchor point server 140 currently servicing the application which will be leaving the communication session. In particular, applications are generally not allowed to leave a communication session early unless they were bound to the communication session via an anchor point 208.

If an application is identified as wanting or needing to leave the communication session, then the method proceeds with the anchor point server 140 and identified application terminating their previously established session (step 424). In particular, the application and anchor point server 140 may discontinue their logical call model signaling session, and the anchor point server 140 may Re-INVITE the call participants to remove the media server from the RTP path.

If no application is identified as wanting or needing to leave the communication session, or after the desired application or media resource has been removed from the session, the method proceeds by returning to step 404.

Referring back to the parallel decision made after step 404, another decision may be made regarding whether or not the session has ended (step 428). If so, then the monitoring of the communication session is discontinued and the anchor point servers 140 release any anchor points 208 previously bound to the communication session (step 432). If not, the method returns back to step 404.

Figure 5:
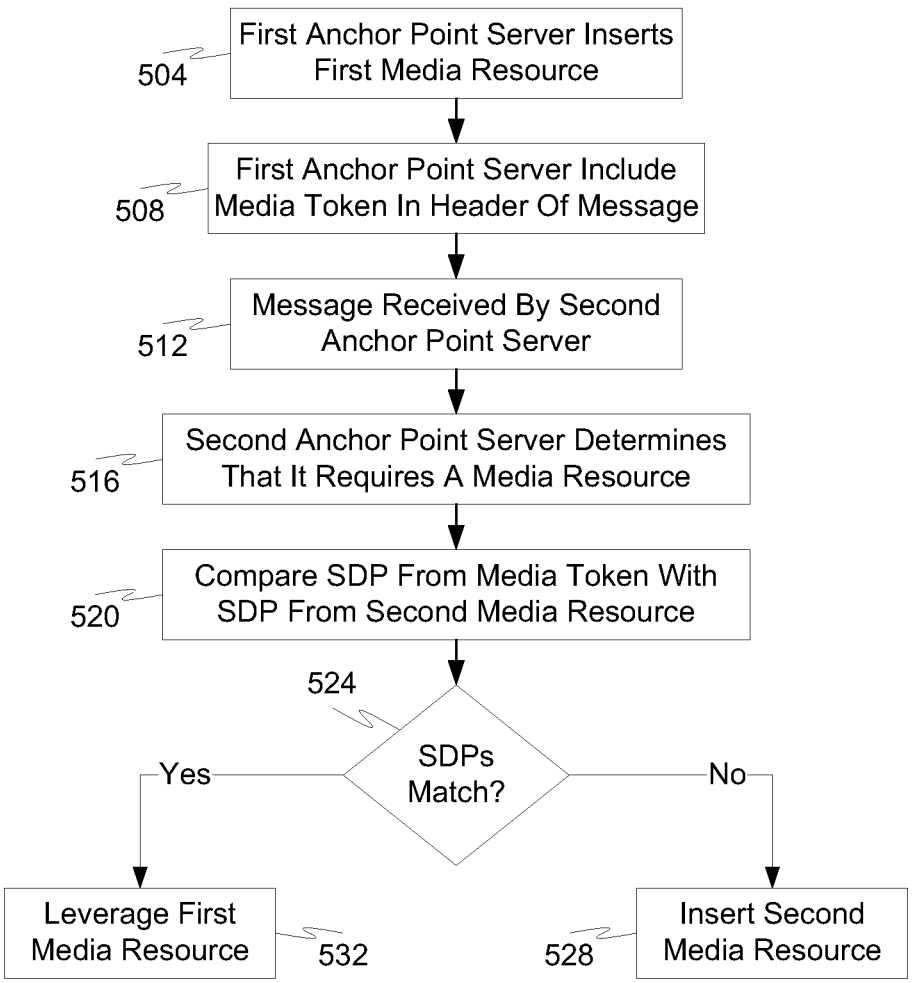
FIG. 5 is a flow diagram depicting a method of managing multiple SIP anchor points in accordance with embodiments of the present disclosure.

Referring now to FIG. 5, an exemplary method of managing multiple anchor points 208 will be described in accordance with at least some embodiments of the present invention. The method begins with a first anchor point server 140 inserting a first media resource into an existing communication session (e.g., via a first anchor point 208) (step 504). The first anchor point server 140 then generates a message for transmission to other anchor point servers 140 administering anchor points 208 involved in the same communication session. Within this message the first anchor server 140 includes a media token within the header that describes the first media resource that is utilizing the first anchor point 208 (step 508). In some embodiments, the message which includes the media token is the INVITE or RE-INVITE message that was transmitted to the participants of the communication session, thereby enabling the first media resource to join the communication session. Since the message transmitted to these participants traverses all other applications included in the logical call sequence, any other anchor point servers 140 involved in the communication session will receive the media token transmitted by the first anchor point server 140 (step 512).

At some point later, and while the first media resources are still involved in the communication session, a second anchor point server 140 determines that media resources (e.g., for a second application) are required for the communication session (step 516). Upon making this determination, the second anchor point server 140 compares the SDP information contained within the media token with the SDP information received from the second media resource (step 520). In making this comparison, the second anchor point server 140 is determining whether or not the first media resources can be leveraged to satisfy the needs of the application looking to join the communication session. If the compared SDP information matches (step 524), then the second anchor point server 140 determines that the first media resources can be reused to satisfy the needs of the application seeking to join the communication session (step 532). If, however, the SDP information does not match, then it is likely that some intermediate media server has been introduced or a conference focus has inserted its own media resources, thereby necessitating the use of the second resources (step 528).

Figure 6:
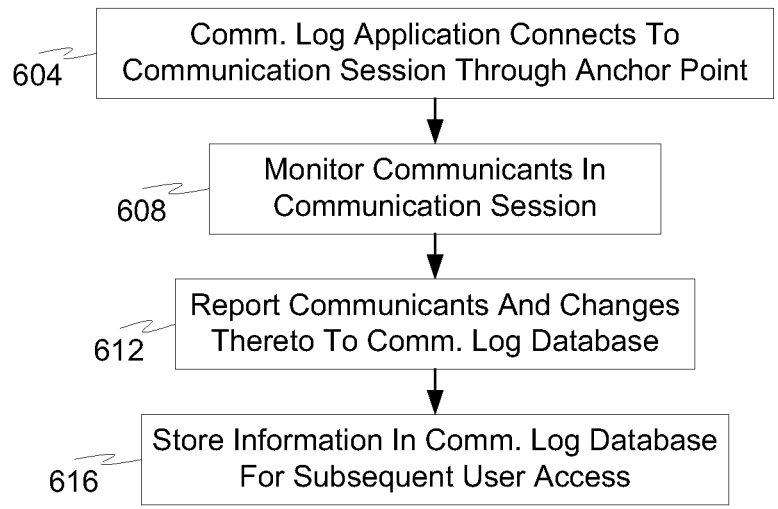
FIG. 6 is a flow diagram depicting a method of leveraging a SIP anchor point to populate a centralized communication log in accordance with embodiments of the present disclosure.

With reference now to FIG. 6 an exemplary method of utilizing anchor points to populate information within a per-user centralized communication log will be described in accordance with embodiments of the present disclosure. The method is initiated when a communication log application connects to a communication session through an anchor point 208 (step 604). The communication log application may be responsible for monitoring all communications for a particular user. As such, the communication log may subscribe to an anchor point server 140 or communication server 124 that is authoritative for its user to receive updates when the user has a new communication. Upon receiving such an update, the communication log application may determine information about that particular communication session by contacting the anchor point server 140, which may have already inserted an anchor point 208 into the communication sequence.

In some embodiments, multiple communication log applications may connect with multiple anchor points 208 to retrieve as much communication log information about a communication session as possible. This situation may occur when each participant to the communication session has their own communication log application monitoring information about that user's communications history.

In some embodiments, the communication log application informs the anchor point server 140 that it wants to proactively, and without further involvement by the communication log application, monitor all communications for a given user. When the anchor point server 140 detects such a communication, the anchor point server 140 may relay to the communication log application all relevant information regarding those communications.

In some embodiments, the anchor points 208 which are leveraged by the communication log application(s) would be sequenced in first on the origination side (i.e., before any sequenced applications) and first on the termination side (i.e., after routing and before any sequenced applications). In particular, the sequence 216 depicted in FIG. 2C may be particularly useful for leveraging communication log applications that populate communication log information in a centralized communication log.

Once connected, the communication log(s) are capable of monitoring the communicants to the communication session (step 608). By virtue of the fact that the anchor points 208 are sequenced in first on both the origination and termination side, they are virtually guaranteed to see all communications that a user is making/receiving, regardless of whether any subsequent sequenced applications redirect the communication. For example, a find-me application may decide that a call should be directed to a user's home phone rather than to their registered enterprise contacts. The anchor point 208 would still allow the user's communication log application to be able to log this call as being targeted to the called party even though none of the user's enterprise endpoints would alert. This extends beyond telephony; for example, for session-based instant messaging, the communication is still monitored by an attachment to the anchor point 208.

A per-user centralized communication log can then be populated by the communication log applications which are monitoring the communication session (step 612). In particular, a per-user centralized database can be used to store the communication log information for a particular user. It may be possible that some or all participants to a communication session share a single communication log 158 as their authoritative log, but this is not a requirement.

As communication log information is retrieved by a communication log application, that application forwards the information, in real-time, to the user's authoritative communication log 158, which subsequently stores such information along with the user's other historical communication log information in the communication log database 162 (step 616). This information may then be made accessible to other entities such as the user, other users if they have permissions to access such information, applications, and so on. Accordingly, the communication log 158 receives real-time communication log information for a user from that user's communication log application and subsequently makes the real-time communication log information available to other interested entities, which may include the user.

It would be preferable to provide a per-user centralized database that is highly available and scaled horizontally such that a database instance would be authoritative for some subset of the user population. This process can be duplicated for every communication session available to an anchor point 208 and communication data for multiple users can be gathered by different communication applications via an anchor point 208 and provided back to the centralized database. The information within the database may be organized and stored according to any number of organization schema. The process depicted in FIG. 6 may be continuously or periodically performed for every communication for a particular user.

Figure 7:
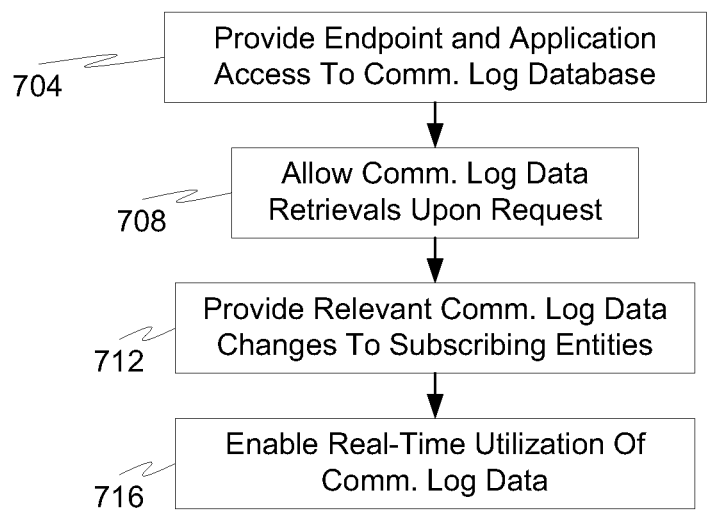
FIG. 7 is a flow diagram depicting a method of providing information from a communication log to one or more entities in accordance with embodiments of the present disclosure.

Referring now to FIG. 7, a method of providing communication log information to interested entities (e.g., endpoints and/or applications) will be described in accordance with embodiments of the present disclosure. The communication log 158 may act as a service interface between the communication log database 162, endpoints and applications (step 704). Endpoints and applications are enabled to retrieve communication logs from this "user store" rather than storing them locally (step 708). In addition, these entities would also be able to subscribe to change events so that they can always display an accurate and up to date communication log for any particular user (step 712). It is important to note that there can be multiple simultaneous communications going on at any given time for a user (e.g., a phone call and an IM session or a conference call and a web-collaboration). The subscription of a given endpoint for a particular user can be to one or more active communication sessions, as well as to notification of new sessions being initiated, regardless of media type.

The information obtained from the communication log database 162 via the communication log 158 may then be utilized by the entities which receive the communication log information to either join in-progress communication sessions, retrieve a call from cover (e.g., voicemail or secretarial coverage), or exert monitoring and/or control operations over an in-progress communication session (step 716). In particular, a user's communication log application may utilize an anchor point 208 to harvest key event information for that user and update the communication log database 162 accordingly. This key event information can then be provided to other interested parties. The data can be provided by the communication log 158 in a data push model or a data pull model. In a data push model, the communication log 158 may have a set of rules identifying entities that have subscribed to event updates for a user, in which case the communication log 158 pushes the updated data to the entities. Alternatively, or in addition, the data pull model can be utilized whereby an entity can query the communication log 158 for communication log information at a particular point in time for a particular user or set of users. The communication log 158 can retrieve the currently available data for user or set of users and provide the requested information to the requesting entity.

This solution scales horizontally and is designed to be accessed at runtime for many consumers. Moreover, historical communication information for a user or group of users is more easily accessible to context searching engines and the like, due to its centralized nature.

Another useful aspect of the present disclosure is that the communication log information which an endpoint displays to a user would not be limited strictly to communication sessions that have occurred in the past. Rather, communication log information may be maintained and updated in real-time. In other words, the communication log application for a particular user could be enabled to show calls that are in progress. This may be utilized as a mechanism which allows the endpoint to join the call or query for more information (e.g., attendees).

In some embodiments, the endpoint may utilize the real-time communication log information obtained from the communication log 158 to take an action or connect with an in-progress communication session. These actions may be accomplished by utilizing the close relationship between the communication log 158 and access point server 140. In particular, communication log information retrieved from the communication log 158 may identify the access point server 140 which was used by the user's communication log application to retrieve the communication log information. This information may then be utilized in real-time to access the communication session via the access point server 140.

Moreover, this would provide an alternate mechanism to bridging to allow a user to transition from one device to another on the same communication session. The process depicted in FIG. 7 may be continuously or periodically performed.

While the above-described flowcharts have been discussed in relation to a particular sequence of events, it should be appreciated that changes to this sequence can occur without materially effecting the operation of the disclosure. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this disclosure can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this disclosure.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into software and/or hardware system, such as the hardware and software systems of a communications device or system.

It is therefore apparent that there has been provided, in accordance with the present disclosure, systems, apparatuses and methods for creating and utilizing anchor points in connection with a communication session. While this disclosure has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

What is claimed is:

1. A method, comprising:
performing, by at least one processor, a Session Initiation Protocol (SIP) call setup to enable a communication session between communicants comprising a first user and a second user and wherein the call setup comprises an application sequence and wherein the communication session comprises a signaling path and a media path;
sequencing, by the at least one processor, a first anchor point into the signaling path of the communication session;
establishing, by the at least one processor, a communication session between the first user and the second user;
monitoring, by the at least one processor executing a communication log application, the communication session for at least the first user via the first anchor point; and
performing, by the at least one processor executing the communication log application, at least one of the following steps:
(i) providing, a per-user centralized communication log database comprising a per-user centralized communication log, the per-user centralized communication log comprising real-time information related to the communicants in the communication session;

(ii) receiving from the per-user centralized communication log, real-time information related to at least one of the communicants in the communication session; and (iii) receiving from the per-user centralized communication log, a notification that the information related to at least one of the communicants has been changed.

2. The method of claim 1, wherein the per-user centralized communication log database is made accessible to at least one of a plurality of endpoints and a plurality of applications via the per-user centralized communication log, and wherein the per-user centralized communication log is a single log containing the real-time information related to at least two of the communicants, and wherein the per-user centralized communication log is partitionable according to instructions from at least one of the communicants and the first anchor point.

3. The method of claim 2, wherein a database instance in the per-user centralized communication log database is authoritative for a subset of a user population.

4. The method of claim 2, wherein the per-user centralized communication log is media agnostic.

5. The method of claim 2, wherein an endpoint not associated with the communication session is granted access to information within the per-user centralized communication log database.

6. The method of claim 1, further comprising:
subscribing, by a processor directed by a first entity, to the per-user centralized communication log database for information related to changes of data in a per-user centralized communication log associated with the first user;
detecting, by the at least one processor, a change in the per-user centralized communication log;
pushing, by the at least one processor, a status update to the first entity, wherein the status update comprises information describing the change in the per-user centralized communication log.

7. The method of claim 6, wherein the first user is not the first entity.

8. The method of claim 7, wherein the change of data associated with the first user comprises a real-time notification that the first user is currently engaged in a communication session with the second user and wherein the real-time notification provides the first entity with an option to join the communication session.

9. The method of claim 1,
wherein the first anchor point is associated with the first user and sequenced into an origination side of the communication session, and wherein a second anchor point is associated with the second user is sequenced into a termination side of the communication session.

10. The method of claim 9, wherein:
the communication log application comprises a first communication log application and a second communication log application;
wherein the first communication log application monitors the communication session with respect to the first user;
wherein the second communication log application monitors the communication session with respect to the second user;
wherein the first communication log application leverages the first anchor point;

wherein the second communication log application leverages the second anchor point;
wherein the first anchor point is sequenced first on the origination-side and;
wherein the second anchor point is sequenced first on the determination side.

11. The method of claim 1, further comprising:
providing, by the at least one processor, real-time communication log information to a communication device associated with the first user, wherein the first user is not initially one of the communicants;
receiving, from the communication device, an indication that the first user desires to join the communication session; and
adding, by the at least one processor, the communication device to join the communication session.

12. The method of claim 1, wherein the server executing the communication log application, further comprises a processor of the server executing the communication log application.

13. A system, comprising:
a communication network interface;
a processor communicating via the communication network interface;
wherein the processor executes a communication log application connected to a Session Initiation Protocol (SIP) communication session via a first anchor point, wherein the first anchor point is included in a signaling path of the communication session, and wherein the communication log application monitors communicant participation in the communication session and at least one of (i) provides information related to the communicants to a per-user centralized communication log, (ii) receives from the per-user centralized communication log information related to at least one of the communicants in the communication session; and (iii) receives notification that the information related to at least one of the communicants has been changed; and
an anchor point server, wherein the anchor point server sequences the first anchor point in a signaling path of a first communication session which is leveraged by the communication log application to monitor communicants of the first communication session;
communicants to the communication session comprise at least a first and a second user, the first anchor point being associated with the first user;
wherein the processor sequences the first and second users into the communication session; and
the communication log application leverages the first anchor point to monitor the communication session with respect to at least the first user.

14. The system of claim 13, wherein a per-user centralized communication log database is made accessible to at least one of a plurality of endpoints and a plurality of applications via the per-user centralized communication log, and wherein the per-user centralized communication log is a single log containing the real-time information related to at least two of the communicants, and wherein the per-user centralized communication log is partitionable according to instructions from at least one of the communicant and the first anchor point.

15. The system of claim 14, wherein a database instance in the per-user centralized communication log database is authoritative for a subset of a user population.

16. The system of claim 14, the per-user centralized communication log database is media agnostic.

17. The system of claim 14, wherein information within the per-user centralized communication log database is provided to an entity upon request.

18. The system of claim 13, wherein the per-user centralized communication log is configured to receive a subscription request from a first entity, wherein the subscription request indicates a desire to receive information related to changes of data in the per-user centralized communication log associated with the first user, wherein the per-user centralized communication log is further configured to detect a change of data associated with the first user and push a status update to the first entity which includes information describing the change of data associated with the first user.

19. The system of claim 18, wherein the first user is not the first entity, wherein the change of data associated with the first user comprises a real-time notification that the first user is currently engaged in a communication session with the second user and wherein the real-time notification provides the first entity with an option to join the first and second users in their communication session.

20. The system of claim 13, wherein the processor executes the anchor point server to further sequence a second anchor point, wherein the second anchor point is associated with the second user, wherein the first anchor point is sequenced into the communication session on an origination-side of the communication sequence, and wherein the second anchor point is sequenced into the communication session on a termination side of the communication sequence.

21. A processor comprising:
   means for connecting a communication log application to a Session Initiation Protocol communication session via an anchor point, wherein the anchor point is included in a signaling path of the communication session;
   means for allowing the communication log application to monitor communicants in the communication session via the anchor point; and
   means for providing information related to the communicants in the communication session; and
   wherein the communicants to the communication session comprise at least a first and a second user, the anchor point associated with the first user is sequenced into the communication session, and the communication log application leverages the anchor point to monitor the communication session with respect to at least the first user.

* * * * *

UNITED STATES PATENT AND TRADEMARK OFFICE
CERTIFICATE OF CORRECTION

PATENT NO.        : 9,521,169 B2
APPLICATION NO.   : 14/586594
DATED             : December 13, 2016
INVENTOR(S)       : Robert E. Braudes et al.

It is certified that error appears in the above-identified patent and that said Letters Patent is hereby corrected as shown below:

In the Claims

At Column 22, Line 6, please delete "determination" and input --termination-- therein.

Signed and Sealed this
Ninth Day of May, 2017

Michelle K. Lee
*Director of the United States Patent and Trademark Office*